J. M. LINDEMON.
PROTECTOR FOR CIRCULAR SAWS.
APPLICATION FILED MAY 22, 1920.
1,409,741.
Patented Mar. 14, 1922.
2 SHEETS—SHEET 1.
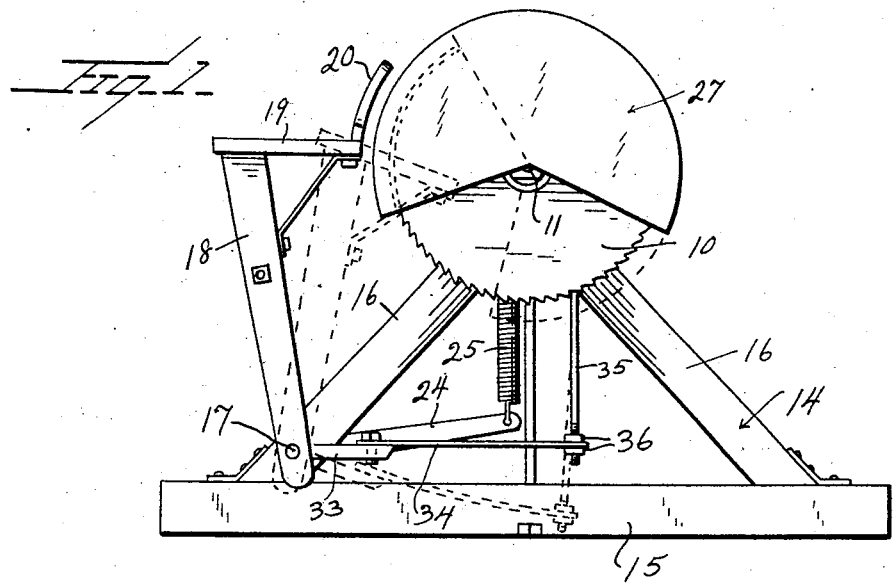
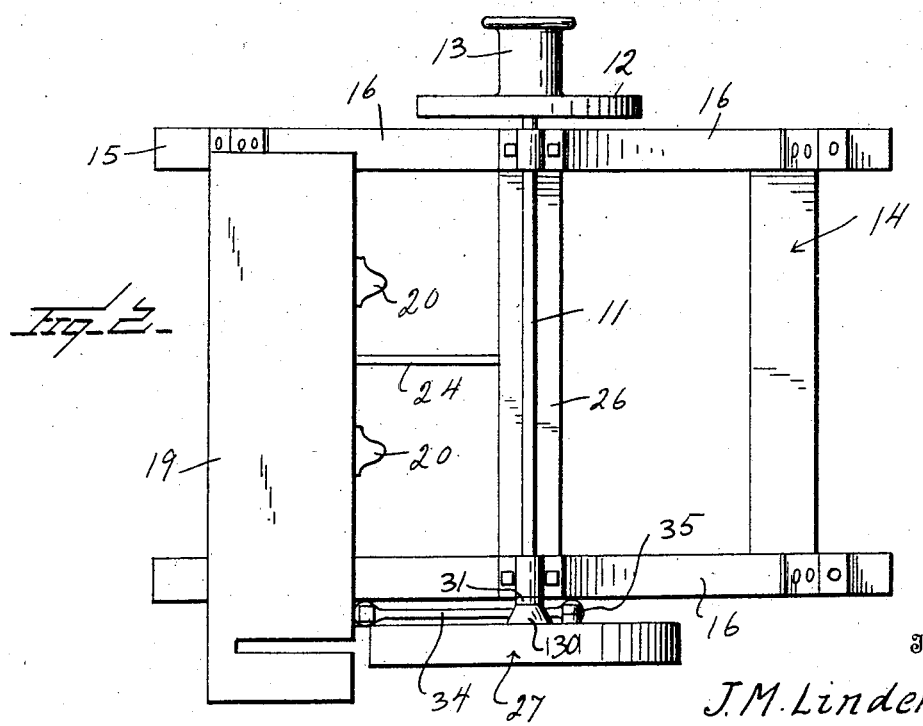
Inventor
J. M. Lindemon
By Watson E. Coleman
Attorney

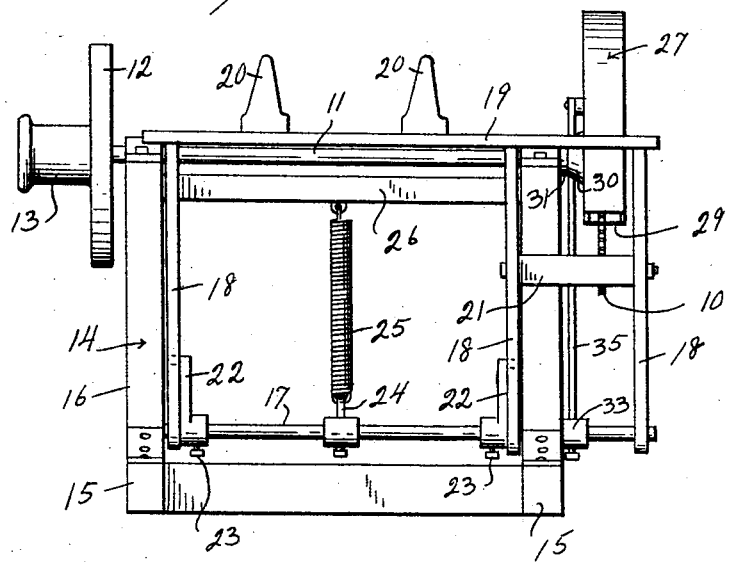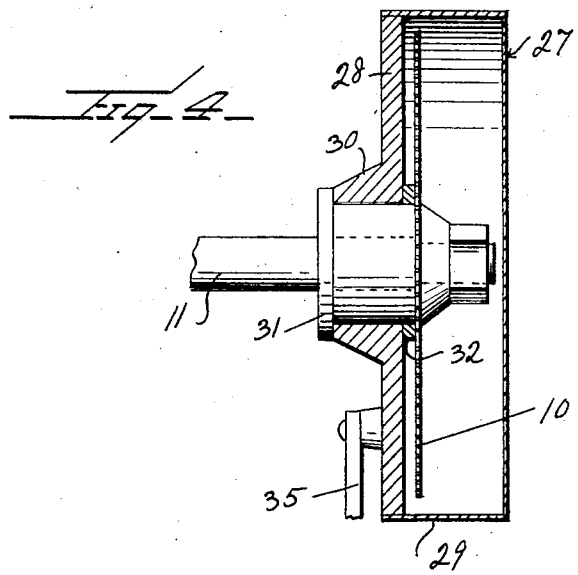

UNITED STATES PATENT OFFICE.

JAMES M. LINDEMON, OF GLENARM, MARYLAND.

PROTECTOR FOR CIRCULAR SAWS.

1,409,741. Specification of Letters Patent. Patented Mar. 14, 1922.

Application filed May 22, 1920. Serial No. 383,562.

*To all whom it may concern:*

Be it known that I, JAMES M. LINDEMON, a citizen of the United States, residing at Glenarm, in the county of Baltimore and State of Maryland, have invented certain new and useful Improvements in Protectors for Circular Saws, of which the following is a specification, reference being had to the accompanying drawings.

This invention relates to circular saws such as are used for sawing timber and the like, and particularly to means for protecting the operator at the table from coming in contact with the circular saw.

The general object of my invention is to provide in connection with a circular saw and a table shiftable toward or from the saw and carrying the work, a shield normally extending over a portion of the cutting edge of the saw, the shield being rotatably mounted and so connected to the table that when the table is pushed forward to carry the work to the saw, the shield will be shifted to uncover that portion of the saw which is to attack the work, and when the table is retracted from the saw for a new cut, the shield will automatically move into position over the portion of the saw adjacent the operator.

A further object is to provide a mechanism of this character which is very simple, may be readily put in place, and which is entirely automatic and positive in its action.

Other objects will appear in the course of the following description.

My invention is illustrated in the accompanying drawing, wherein:—

Figure 1 is an end elevation of a circular saw provided with my improved protector;

Figure 2 is a top plan view of the construction shown in Figure 1;

Figure 3 is a front elevation of the construction shown in Figure 1;

Figure 4 is a vertical longitudinal section through the shield showing the saw and saw arbor in elevation.

Referring to these drawings, 10 designates a circular saw which is secured to one end of a shaft 11 and adapted to rotate therewith. A fly wheel 12 is mounted on the opposite end of the shaft and is adapted to rotate the shaft 11 through the medium of a belt pulley 13. The shaft or arbor 11 is mounted in suitable bearings on a frame, designated generally 14, this frame being mounted upon a base 15 and including downwardly and outwardly extending braces or legs 16. Passing through one pair of these legs 16 is a shaft 17, and this shaft passes through the lower ends of a plurality of upwardly extending legs 18 carrying a work table 19 supported by suitable brackets and having work stops 20. All of these parts are of any usual or suitable construction and are operated by the sawyer laying the piece of timber upon the table and shifting the table toward the saw to cut off a projecting end of the timber, and then retracting the table, shifting the work thereon to a new position, and again cutting off a length.

I have illustrated the legs 18 as being three in number, two of these legs being disposed at that end of the table adjacent the saw and being connected by a brace 21. Mounted on the shaft are a pair of arms 22 having outwardly projecting lugs extending into two of these legs 18. These arms 22 are mounted upon the shaft 17 to be rotatably adjusted thereon and held in place by means of set screws 23. Also carried by the shaft 17 is an arm 24 from which a coiled spring 25 extends to a suitable support 26 on the frame so that this spring acts to retract the table in an obvious manner.

In order to protect the sawyer from accidents, I provide a shield, designated generally 27, which shield is segmental in side elevation and may consist of a disk 28 either fully circular or segmental in elevation, this disk having extending from it the arcuate marginal flange 29 which extends over the saw blade in spaced relation thereto. This disk 28 is formed with a hub 30 which is freely mounted on the shaft 11, and adapted to rotate independently of the shaft, there being a collar 31 on the shaft holding the disk in place, and there being a washer 32 between the saw and the hub of the disk 28. Extending from the shaft 17 is a relatively short arm 33 to which is bolted one end of a rod 34 which forms an extension to this arm, this rod being somewhat resilient and being pierced at its extremity. Attached to the disk 28 is a rod 35 which, at its lower end, is screw-threaded and passes through the opening in the extension rod 34 and is engaged therewith by means of the oppositely disposed nuts 36. As before remarked, the rod 34 is somewhat yielding, as is the rod 35.

With this construction, it is obvious that when the table 19 is shifted toward the saw, the shaft 17 is rotated to depress the arm 33 and the rod 34, and this causes the rod 34 to pull the arm 35 toward the operator, thus rotating the shield from the position shown in full lines in Figure 1 to the position shown in dotted lines in Figure 1. When the operator releases the pressure on the table, the spring 25 will draw the table back to its original position and, of course, carry the arm 33 back to its initial position, thus rotating the shield in a counter-clockwise direction so as to carry the shield between the operator and the saw and thus prevent the operator from contacting with the saw.

While I have illustrated a particular form of my invention which I believe to be particularly efficient, I do not wish to be limited thereto, as it is obvious that many changes might be made in the form of the invention without departing from the spirit thereof as stated in the appended claims.

I claim:—

1. A protecting mechanism for circular saws comprising a support and arbor for a circular saw, a shield mounted on the arbor of the saw for movement independently of said arbor and saw, a rotatable shaft mounted on the support, a table connected to the shaft, a pair of arms projecting from the table, one of said arms being operatively connected to the shield, a spring connecting the remaining arm to the support, whereby movement of the table toward the saw against tension of the spring will cause rotation of the shield out of the path of movement of the table.

2. A protecting mechanism for circular saws comprising a support and arbor for a circular saw, a shield mounted on the arbor of the saw for movement independently of said arbor and saw, a rotatable shaft mounted on the support, a table connected to the shaft, a pair of arms projecting from the shaft, one of said arms being operatively connected to the shield, a spring connecting the remaining arm to the support, whereby the spring will automatically urge the shield and table to their normal positions upon release of said table.

3. The combination with a support, an arbor and a circular saw mounted on said support, of a saw shield rotatably mounted on the arbor of the saw, a second shaft rotatably mounted on the support, a table fixed to the shaft, and means operatively connecting the shield to the shaft whereby movement of the shaft will cause corresponding movement of the shield.

In testimony whereof I hereunto affix my signature.

JAMES M. LINDEMON.